April 14, 1964 A. E. JOEL, JR 3,129,290

IMPULSE REGISTER

Filed June 30, 1959 7 Sheets-Sheet 1

INVENTOR
A. E. JOEL, JR.
BY S. E. Hollander
ATTORNEY

April 14, 1964 A. E. JOEL, JR 3,129,290

IMPULSE REGISTER

Filed June 30, 1959 7 Sheets-Sheet 2

INVENTOR
A. E. JOEL, JR.
BY S. E. Hollander
ATTORNEY

INVENTOR
A. E. JOEL, JR.
BY S.E. Hollander
ATTORNEY

INVENTOR
A. E. JOEL, JR.
BY S. E. Hollander
ATTORNEY

INVENTOR
A. E. JOEL, JR.
BY S. E. Hollander
ATTORNEY

April 14, 1964 A. E. JOEL, JR 3,129,290

IMPULSE REGISTER

Filed June 30, 1959 7 Sheets-Sheet 6

INVENTOR
A. E. JOEL, JR.
BY
S. E. Hollander
ATTORNEY

April 14, 1964 A. E. JOEL, JR 3,129,290

IMPULSE REGISTER

Filed June 30, 1959 7 Sheets-Sheet 7

INVENTOR
A. E. JOEL, JR.
BY S. E. Hollander
ATTORNEY

United States Patent Office 3,129,290
Patented Apr. 14, 1964

3,129,290
IMPULSE REGISTER

Amos E. Joel, Jr., South Orange, N.J., assignor to Bell Telephone Laboratories, Incorporated, New York, N.Y., a corporation of New York Filed June 30, 1959, Ser. No. 823,987
27 Claims. (Cl. 179—18)

This invention relates to registration arrangements and more particularly to devices for registering and segregating digits received concurrently by different types of signaling.

In certain instances in telephone switching operations it is advantageous to transmit information pertaining to a single block of intelligence, e.g., a called directory number, over a plurality of transmission media. Thus, if a called telephone directory number is to be transmitted from a local office to a tandem office, it may be useful, as shown herein, to transmit certain digits of the number, such as the first two digits, by one type of pulsing which may illustratively be multifrequency pulsing. The remaining digits may be transmitted by a different type of pulsing such as direct-current pulsing.

The motivation for dividing the single unit of information into two separate portions for transmission purposes derives from the problems which inhere in the use of automatic recording features in conjunction with step-by-step telephone systems. In certain prior systems of this nature it was necessary to provide full registration capacity for all of the digits which a subscriber was expected to dial in making a toll call. If, for example, the subscriber was required to dial eleven digits, registration capacity was provided at the local office for the full eleven digits. As is well known in step-by-step systems, a number of the eleven digits required to be dialed are expended or "lost" in reaching the outgoing trunk to tandem. The "lost" digits in ordinary course are reconstructed and stored with the later dialed digits in an outgoing register sender in the local office. All eleven digits are subsequently transmitted in appropriate order by the register sender.

The necessity for storing all of the digits in the local office and then transmitting them en masse to the tandem office imposes a severe economic and signaling burden. If arrangements were available for transmitting the dialed digits directly over the outgoing trunk to tandem once the subscriber has reached the trunk by dialing preliminary digits, the need for storing all of the digits in the local office is overcome with an attendant savings in cost.

As indicated above, however, a number of the digits expended or "lost" in reaching the outgoing trunk to tandem must be reconstructed and dispatched along with the later dialed digits in order to provide complete routing and billing information at the tandem office.

Thus in accordance with my Patent No. 2,941,042 of June 14, 1960, which is herewith incorporated by reference, it was demonstrated that in order to eliminate needless duplication of registration capacity at the local and tandem offices and to sharply diminish the total registration capacity needed at the local office itself, separate transmission media could be utilized for (1) transmitting the digits dialed in reaching the outgoing trunk to the tandem and (2) transmitting the subsequently dialed digits.

In the above-referred-to application, when a subscriber has dialed sufficient digits to reach an outgoing trunk to tandem, his line is connected directly to the trunk and the subsequent digits which he dials are directly transmitted by direct-current pulsing over the trunk to tandem and stored thereat. Concurrently, the digits which were expended in reaching the outgoing trunk to tandem are reconstructed and transmitted by multifrequency pulsing over the same trunk to tandem.

By implementing the arrangement described in my previous application the number of registers required at the local office is reduced to merely sufficient capacity to store the reconstructed ("lost") digits and one additional digit dialed into the trunk while awaiting connection of a receiver at the tandem office. The consequent savings in registration capacity is obvious.

Although particularly advantageous and useful for the reasons described above, the type of transmission suggested in my previous application presents formidable problems in storage and registration at the tandem office. For example, the total number of digits constituting a called directory number does not vary in a particular application, that is, it may comprise eleven digits. However, the number of digits expended in reaching an outgoing trunk to tandem does vary and in the arrangement described in my previous application it may range from two to four digits. Since the total number of digits constituting a called directory number is constant, the remaining digits which are dialed directly over the trunk may comprise seven to nine digits.

Moreover at the tandem office no previous information is available as to how many of each type of digit, i.e., those transmitted by multifrequency pulsing and those transmitted by direct-current or dial pulsing, will be received in any particular instance; it may ordinarily be assumed therefore that registration capacity must be available for the ultimate contingency of nine direct-current digits and the corresponding contingency of four multifrequency current digits. Thus although as hypothesized the total number of digits in any given called directory number will not exceed eleven, the separation of transmission media dictates the necessity for provision of facilities at the tandem office for thirteen digits, i.e., a maximum of nine direct-current digits and four multifrequency digits.

In consequence, as is often the case when a measurable forward stride is made in telephone switching technology, new problems are precipitated which must be solved to effectively consolidate the newly acquired position.

It is therefore an object of this invention to reduce the total registration capacity required in the tandem office to a value which is less than the cumulative respective maxima of the digits which may be transmitted thereto by direct-current and multifrequency pulsing.

It is a further object of this invention to limit the registration capacity in the tandem office to an amount equal to the total of digits required to designate a called directory number.

A further object of this invention is to provide a flexible register adapted to store information representing an integral block of intelligence but transmitted over two separate channels.

Still another object of this invention is to provide for reception and storage of a varying number of digits arriving over two separate channels where the sum of the digits in both channels is fixed.

A further object of this invention is to provide for storage of information in varying sequence in a register.

In accordance with an illustrative embodiment disclosed herein, a telephone tandem or intermediate office is provided with novel registration facilities for receiving information representing a called telephone directory number over two separate transmission media, i.e., multifrequency pulsing for the digits "lost" or expended in reaching an outgoing trunk to the tandem office and for a digit dialed while awaiting connection of a receiver at the tandem office and direct-current pulsing for the later dialed digits dialed directly over the trunk to tandem by the subscriber. Since the tandem office is, in conventional telephone practice, a transitional repository of intelligence or control information, it is essential that the information forwarded by the tandem office to the terminating office precisely duplicate in number and sequence the digits dialed by the calling subscriber at the originating local office. In light of my above-referred-to application, wherein it is entirely feasible for the multifrequency pulses to arrive simultaneously at the tandem office with the subsequent direct-current dialed pulses, it is necessary to reestablish the time order in which they were originally dialed by the calling subscriber.

It is therefore an additional object of this invention to provided registration facilities at the tandem office adapted to receive cumulative intelligence representing a called directory number over two separate transmission media and to retransmit the cumulative intelligence in the order of its origination by a calling subscriber.

Still another object of this invention is to provide for registration and retransmission of information representing a called telephone directory number, which information is derived over two separate channels, each channel being adapted to tranmit a varying quantity of information.

These and other objects of the invention are realized in an illustrative embodiment in which registration facilities of the tandem office incoming sender include a number of stages equal only to the total number of digits to be transmitted by both multifrequency and direct-current dial pulsing. Assuming that eleven digits are required to be transmitted by the calling subscriber, eleven stages are provided in the tandem office register.

The eleven stages in the register are adapted to receive a maximum of four digits by multifrequency pulsing and a minimum of two digits by multifrequency pulsing. Since eleven digits must be transmitted in each instance the remaining direct-current dialed digits are respectively seven and nine.

Under the assumed conditions it is clear that at least the minimum or two multifrequency digits will be transmitted in each instance. These two digits are stored in two permanently assigned stages of the register. Similarly, it may be deduced from the above that at least seven direct-current dialed digits will be transmitted in each instance and seven additional stages in the register are assigned specifically to their use. In consequence, nine of the assumed eleven registration stages are accounted for. The remaining two stages have a dual function and are utilized for both direct-current dialed digits or multifrequency pulsed digits as requirements dictate.

Thus in an instance in which an eleven-digit directory number is called and where the first two digits are transmitted by multifrequency pulsing and the last nine by direct-current pulsing, the tandem office incoming sender stores the first two digits in the usual location for the first two multifrequency or M.F. digits. The third through ninth digits which are dialed by direct-current or D.C. pulsing are stored in the regularly assigned seven register stages reserved for dialed digits as explained above. The last two direct-current digits, however, are stored in the two register stages which serve the dual purpose function.

If the called directory number included four digits received by multifrequency pulsing, the first two digits would be stored, as described above, the third and fourth multifrequency digits, however, would be stored in the dual function stages. As usual the remaining seven direct-current digits would be stored in the seven stages permanently assigned to receive direct-current digits.

In a similar manner, if the called directory number includes three multifrequency or M.F. digits and eight direct-current digits the last M.F. digit is stored in one of the two dual function stages and the last direct-current digit is stored in the other of the dual function register stages.

Since the digits received by direct-current and multifrequency pulsing may be stored in varying locations in the register to accommodate the dual purpose stages, in-steering and out-steering facilities are required for reestablishing the correct order of digits for transmission to the terminating local office. Steering in the appropriate order is accomplished by a circuit responsive to the ratio between direct-current and M.F. digits which serves to route the digits into the registers and from the registers to an outpulsing circuit in the correct order.

A feature of this invention is a flexible register adapted to store digits received over two separate channels which digits collectively represent a single block of intelligence or word.

An additional feature of this invention is a register having three groups of stages wherein the first group of stages is reserved for storage of digits transmitted over a first channel, a second group of stages is reserved for storage of digits transmitted over a second channel and a third group of stages is adapted to store digits received over either channel as requirements dictate.

An additional feature of this invention is a register having a capacity in number of stages which is less than the cumulative respective maxima of the digits which may be received over both channels.

Still another feature of this invention is a register having stages adapted to store information in varying sequence in accordance with the relative proportions of information received over both channels A further feature of this invention is a register adapted to receive digits by direct-current and multifrequency pulsing wherein the digits transmitted by both signaling forms comprise a single called telephone directory number.

Still another feature of this invention is a register adapted to receive and store a called directory number transmitted in part by multifrequency and in part by direct-current pulsing wherein the relative proportions of signals transmitted by each form may vary.

An additional feature of this invention includes in-steering facilities for storing the received digits in appropriate order in the register in accordance with the ratio of multifrequency to direct-current digits.

A further feature of this invention is an out-steering circuit adapted in accordance with the relative proportions of multifrequency to direct-current digits to steer out a called telephone directory number in the order of its origination by a calling subscriber although the directory number is not received in the original order and is not stored in the original order.

These and other objects and features of the invention may be more readily comprehended by reference to the following specification and attached drawing, in which.

GENERAL DESCRIPTION OF COMPLETION OF A CALL

Figures 7, 8:
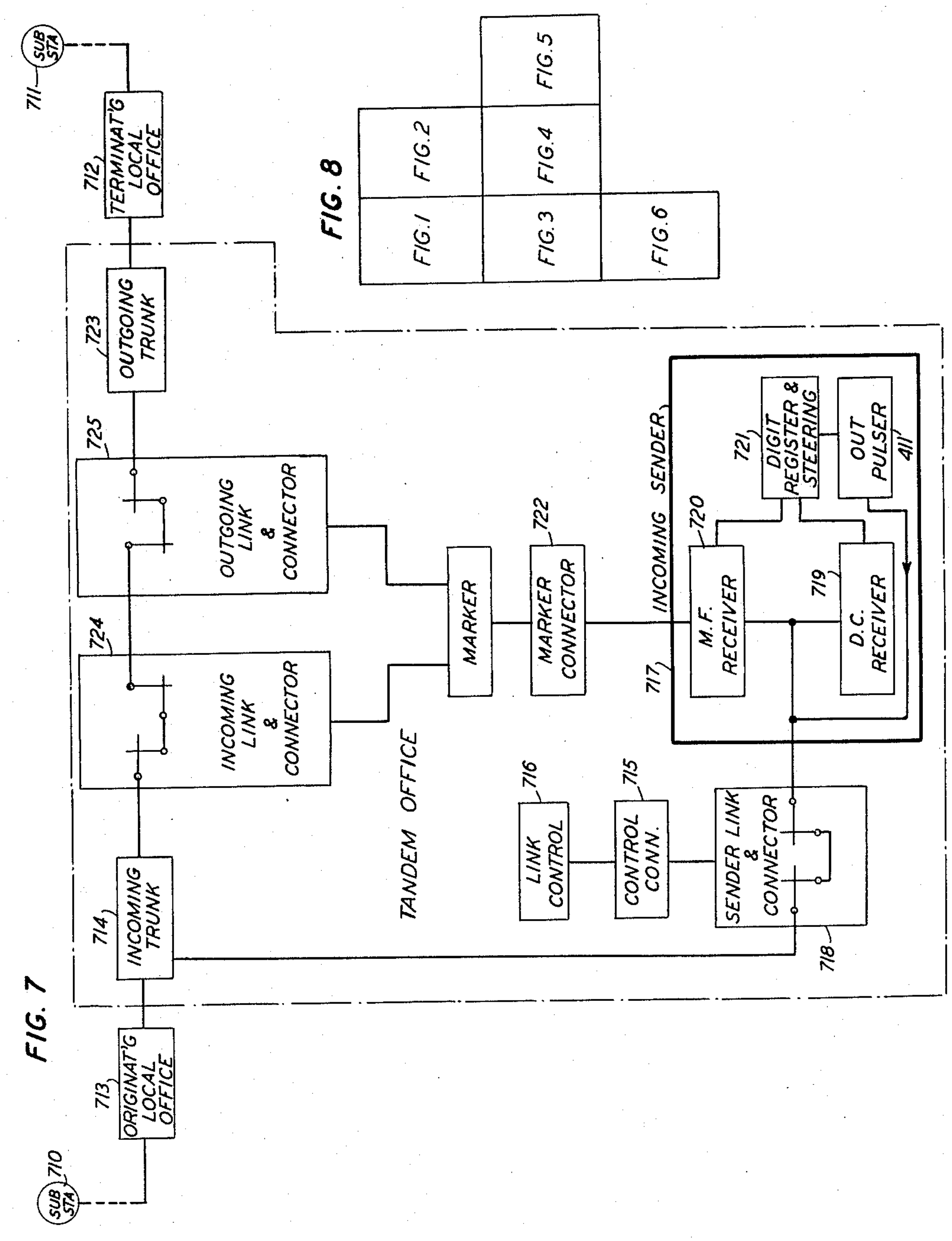
FIG. 7 shows in outline form the equipment utilized in completing a connection.
FIG. 8 indicates the manner in which FIGS. 1–6 may advantageously be arranged to disclose one specific illustrative embodiment of the invention.

Referring now to the outline diagram shown in FIG. 7, the equipment utilized in a typical call operation is set forth in general form. Assuming that a caller at substation 710 seeks to effect a connection to a called party at substation 711 in a remote local office 712 via a tandem office, the operation will be described in simplified form.

When a calling subscriber at substation 710 lifts the receiver, a connection is extended from the substation 710 to the local office 713 and the subscriber is given dial tone. As the subscriber at substation 710 begins dialing the digits of the called directory number, registration facilities in local office 713 are activated to store the digits. In this regard, the local office 713 is similar to that shown in greater detail in my Patent No. 2,941,042 of June 14, 1960. Since the call is assumed to extend through an intermediate or tandem office, the first digits, i.e., 1, 2 or 3 digits, dialed by the calling subscriber will extend the calling connection to a trunk connnected to the tandem office. In course of operation, the incoming trunk circuit 714 at the tandem office is seized and a control connector 715 selects an idle link control circuit 716. The control circuit 716 tests for an idle incoming sender, such as sender 717, and a path through sender link and connector 718. The sender link switches are operated to connect the selected sender 717 with incoming trunk circuit 714.

When this conection is established, the equipment in the local office 713 is activated in the manner described in my previous application to permit subsequent dialed digits by the calling subscribed to proceed directly over the trunk between the local office and the tandem office and the tandem office into the D.C. receiver 719 of the incoming sender 717.

In like manner, the initial digits dialed by the calling subscriber which were "lost" or expended in reaching the outgoing trunk circuit to tandem are pulsed forward in the manner shown in my above-referred-to application and stored in the M.F. receiver of incoming sender 717.

The manner in which the D.C. dialed digits and the M.F. digits are stored in the sender and reconstituted for transmission to the remote local office 712 in the incoming sender 717 are treated comprehensively in the detailed description that follows.

As will be shown herein, the digits received by direct-current pulsing and those received by multifrequency pulsing are respectively routed through D.C. receiver 719 and M.F. receiver 720 to the digit register and steering circuit 721 which stores all of the direct-current and multifrequency digits and reorganizes their order prior to retransmission (to the terminating office 712) by the sender to accurately reflect the order in which the digits were dialed by the calling subscribed at substation 710. Digit register and steering circuit 721 accomplishes this function under circumstances where the relative numbers of digits transmitted by D.C. and M.F. pulsing vary appreciably.

When the sender 717 has received the called office code or routing digits, the sender operates the marker connector 722 to connect with an idle marker and transfers the office code to the marker. The marker translates this code into a routing, selects an idle outgoing trunk according to the routing and operates an appropriate incoming link and connector and outgoing link and connector as shown to connect incoming trunk 714 with an outgoing trunk 723 extending to the terminating local office 712.

Assuming that the call is directed to a substation 711 at a step-by-step office 712, the marker will instruct the sender that loop dial pulses are required. The sender 717 then transmits loop dial pulses back over the sender link 718, incoming trunk 714, the incoming and outgoing links and connectors 724 and 725, outgoing trunk 723 to operate the selectors and connector in local office 712 to complete connection with substation 711 in accordance with the digits of the called directory number.

In the present description the arrangements shown are those incorporated in the incoming sender 717 but do not include all of the equipment ordinarily present in incoming sender 717 and instead are limited to only that apparatus essential to an understanding of the present invention. The additional apparatus for use in conjunction with the present invention and not shown in detail in FIGS. 1 through 6, may be examined in detail in Patent No. 2,564,441 of B. McKim et al. of August 14, 1951, which is herewith incorporated by reference.

DESCRIPTION OF MAJOR COMPONENTS IN THE INCOMING SENDER

Figure 1:
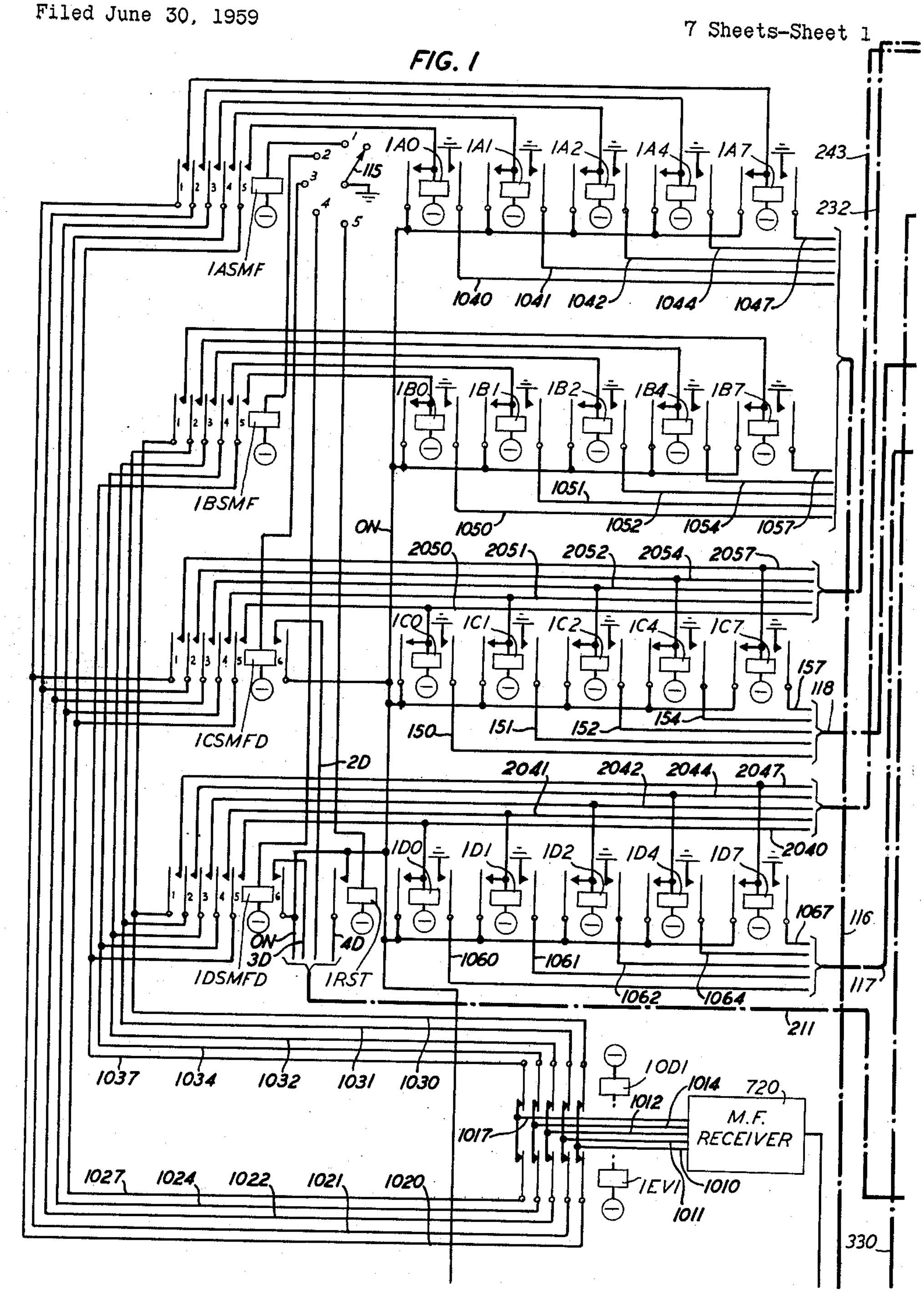
FIG. 1 shows in block form the multifrequency receiver and a portion of the digit register.

The registration facilities shown in the McKim et al. patent referred to above, have been modified in accordance with the instant arrangement to include facilities for receiving direct-current and multifrequency digits simultaneously and to provide registers for the dual purpose storage technique described above. Thus, storage relays 1A0 through 1A7 of FIG. 1 are reserved for storage of the first multifrequency digit steered through relay 1ASMF. Similarly, relays 1B0 through 1B7 are reserved for storage of the second multifrequency digit which is steered through relay 1BSMF.

Relays 1CSMFD and 1DSMFD are the steering relays for the dual purpose registers 1C0 through 1C7 and 1D0 through 1D7. Thus as will be shown herein, relays 1C0 through 1C7 may store the third multifrequency digit steered through relay 1CSMFD or the ninth direct-current digit steered through the contacts of relay 22D of FIG. 2 over cable 243.

In this respect, it may be noted that relays 22D, 23D and 24D with their associated contacts, constitute a steering facility adapted in response to the ratio of multifrequency digits to direct-current digits to perform the necessary in-steering and out-steering functions required herein. Thus the steering circuitry, including relays 22D, 23D and 24D, carries the burden of storing the digits in proper sequence in the digit registers 1CSMFD and 1DSMFD and in each instance steers the digits out of all of the registers 1A0–1A7 to 3L0–3L7 in the appropriate sequence, i.e., the order in which the digits were originally dialed. It will be noted from the discussion herein that this is a task of considerable complexity since the location in which digits are stored in the registers varies with each change in the ratio of multifrequency digits to direct-current digits.

As an illustration in general terms of the functioning of the modified incoming senders, it will be assumed that the called directory number comprising a total of eleven digits includes two multifrequency digits and nine direct-current digits. The multifrequency digits are received in a multifrequency receiver 720, shown in outline form in FIG. 1. This receiver is of a conventional type as explained in the McKim et al. patent. The digits stored in the multifrequency receiver are ultimately transferred over conductors 1010 through 1017 in two-out-of-five code designation to relays 1EV1 and 1OD1, which relays connect conductors 1010–1017 alternately to the contacts of steering relays 1ASMF through 1DSMFD. The manner of progression of successive digits through the steering relays and the operation of odd and even relays 1OD1 and 1EV1 alternately is well known and is explained in detail in McKim et al. Successive operation of relays 1ASMF–1DSMFD is shown symbolically by the advance of stepping switch 115 which may, for example, be operated by a relay (not shown) responsive to the arrival of each M.F. digit and which completes obvious paths for the operation of the respective relays. The first two multifrequency digits are thus stored in relays 1A0–1A7 and 1B0–1B7 in the two-out-of-five code.

Figure 2:
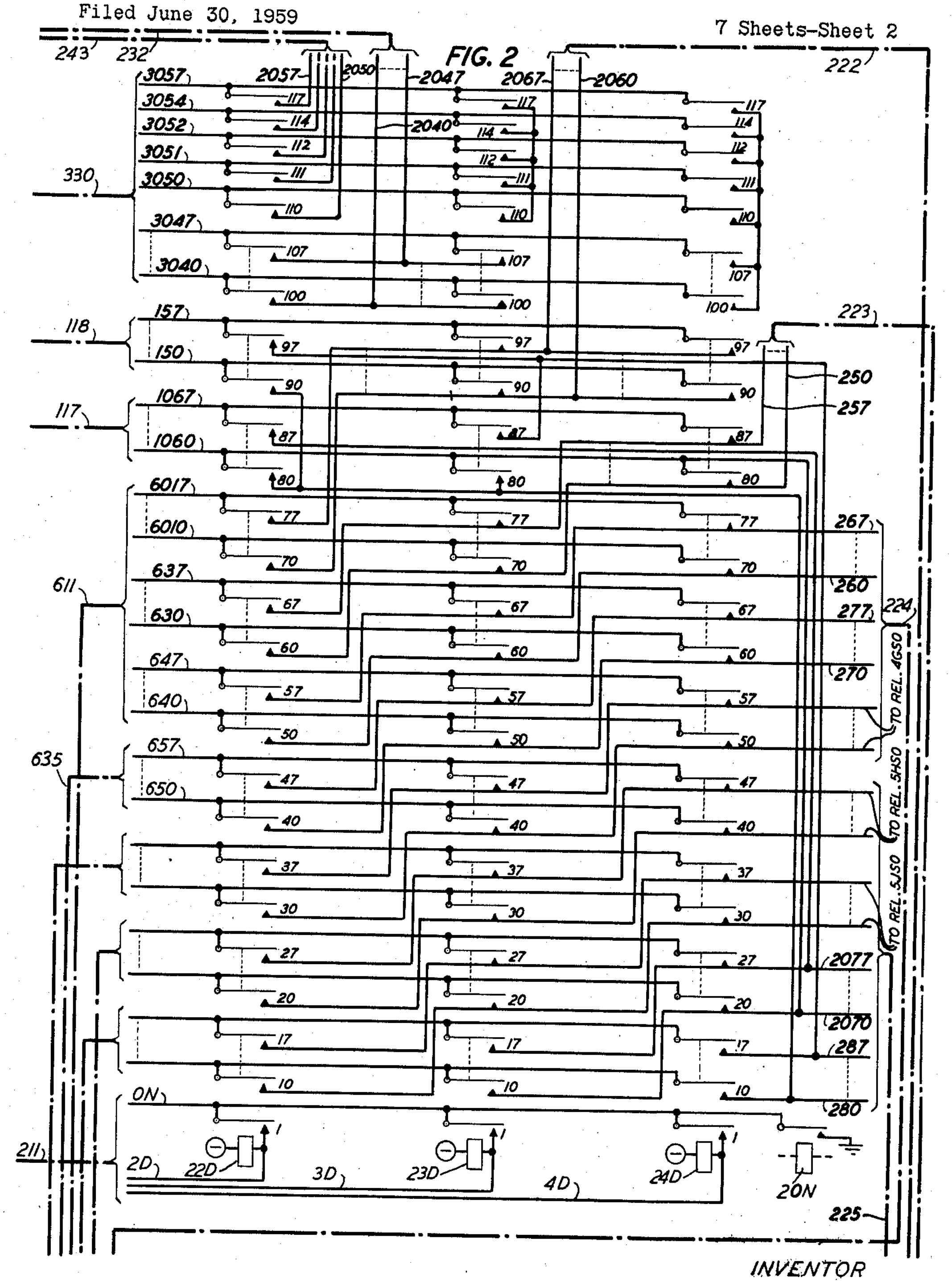
FIG. 2 shows the in-steering and out-steering circuits for transfer of digits from the receivers into the digit register and from the digit register into the out-pulser, respectively.

The direct-current digits, which may be simultaneously received with the multifrequency digits, are received in direct-current receiver 719 shown in outline form in FIG. 2 and which includes a conventional dial pulse counter which is alternately connected by means of relays 3OD and 3EV to the contacts of relays 6ASD–3JSD. The odd-even steering arrangement including relays 3OD and 3EV is similar to that of relays 1OD1 and 1EV1 and is shown in detail in the McKim et al. patent. For illustrative purposes, the odd-even relays may be considered to be responsive to the operation of the stepping selectors or the relays (not shown) which advance the selectors.

Thus far, the first two multifrequency digits have been stored in relays 1A0 through 1A7 and 1B0 through 1B7. Of the remaining nine direct-current digits, the steering relays 6ASD through 3GSD, in conjunction with the alternate operation of relays 3OD and 3EV, result in the storage of the first seven direct-current digits in relays 6E0–6E7 through 6J0–6J7 and relays 3K0–3K7 and 3L0–3L7, respectively. The manner of progression of the steering relays 6ASD–6ESD and 3FSD and 3GSD is conventional and similar to that shown in the McKim et al. patent for the advance of relays 1ASMF–1DSMF. In the instant illustrative embodiment, the operation is shown symbolically using stepping selector 310 which also may illustratively be actuated by a relay (not shown) responsive to the arrival of D.C. digits.

With the storage of the first seven direct-current digits a total of nine digits (including the two M.F. digits) has been stored. The remaining two direct-current digits cannot be stored in the seven registers ordinarily reserved for direct-current digits since they have already been filled.

The steering circuitry of FIG. 2 now functions to store the remaining two direct-current digits in the two registers reserved for dual function storage, i.e., relays 1C0–1C7 and 1D0–1D7. When steering relay 3HSD operates in consequence of the stepping of switch 310 to position 8, in response to the arrival of the eighth D.C. digit, a circuit is extended over the contacts of relay 22D which relay was operated at the No. 6 contacts of relay 1CMSFD, as discussed just below, to connect the contacts of relay 3HSD through the contacts of relay 22D and finally to the contacts of of relays 1D0–1D7. The last direct-current digit is steered through the contacts of relay 3JSD and extends to the contacts of relay 22D and finally to the contacts of relays 1C0–1C7 where the ninth direct-current digit is stored.

In this respect it will be noted that when the incoming sender is seized, selector 115 is advanced to position 1 to operate relay 1ASMF in a manner similar to that explained for the operation of relay AS (5) of the McKim et al. patent. When the first MF digit to be stored is received in M.F. receiver 720, selector 115 proceeds to position 2 to operate relay 1BSMF also in a manner similar to that in the McKim et al. patent.

Thus when the two MF digits were stored in relays 1A0–1A7 and 1B0–1B7 selector 115 moved to position 3 to operate relay 1CSMFD. Relay 22D now operates over a path including the contacts of off-normal relay 2ON (which relay operates when the sender is seized), conductor ON, cable 211, conductor ON, No. 6 contacts of relay 1CSMFD, conductor 2D, cable 211, conductor 2D, winding of relay 22D to battery.

In summary, the first two multifrequency digits are now stored in relays 1A0–1A7 and 1B0–1B7. The first seven direct-current digits are stored in relays 6E0–6E7 through 3L0–3L7. The next-to-last direct-current digit has been stored in relays 1D0–1D7 and the last direct-current digit in relays 1C0–1C7.

Figure 3:
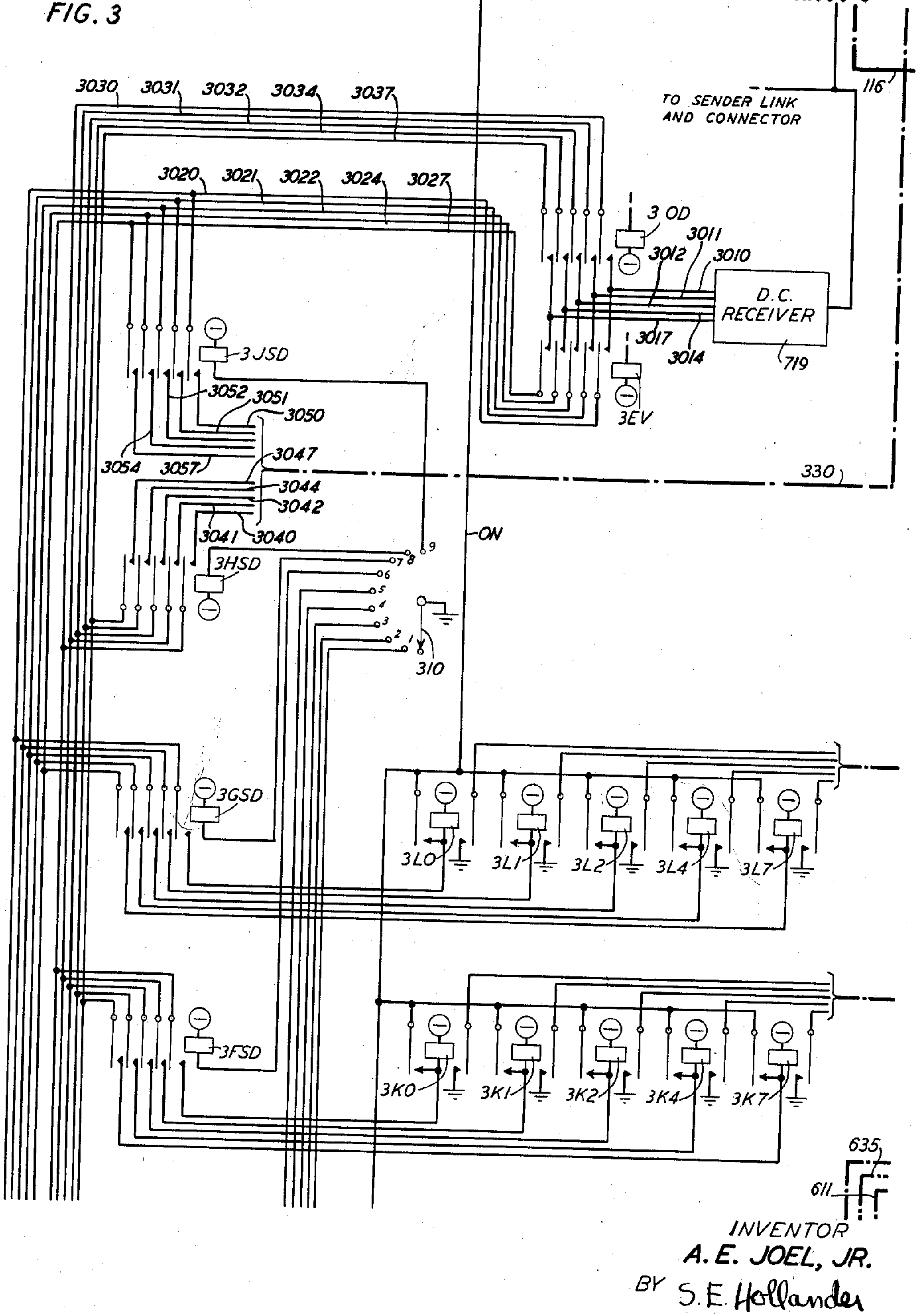
FIG. 3 shows an additional portion of the digit register and the direct-current receiver.
Figure 6:
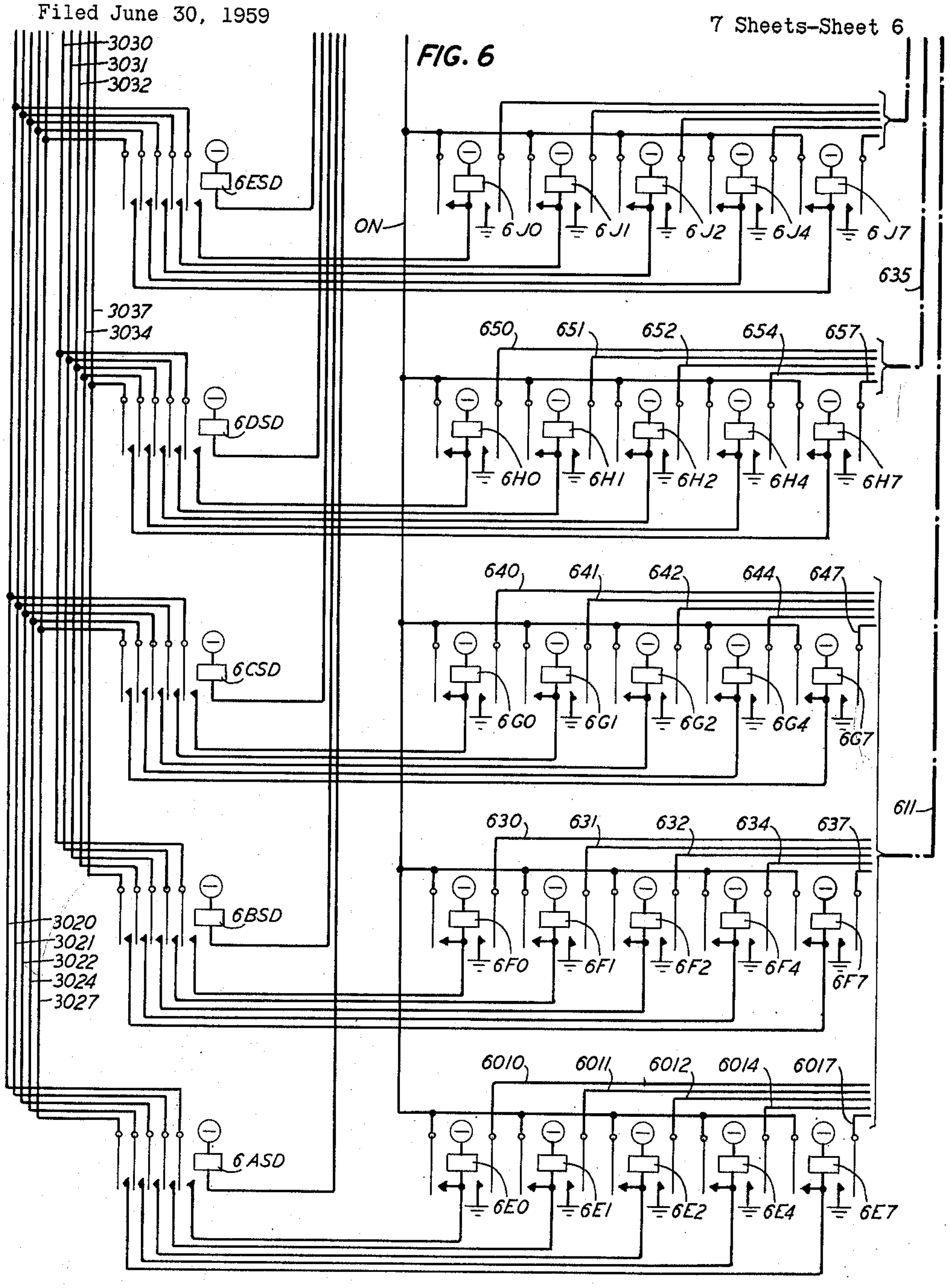
FIG. 6 shows an additional portion of the digit register reserved for storage of direct-current digits.

It will be appreciated from an examination of FIGS. 1, 3 and 6 that the digits are not stored physically in an order which is representative of the sequence in which the customer dialed the digits.

To reorient the direct-current and multifrequency digits in the correct sequence for retransmission to the terminating office, the steering circuit of FIG. 3 is again utilized. For example, in steering out the digits stored in relays 1A0–1A7 and 1B0–1B7, a direct connection is made to the contacts of out-steering relays 5ASO and 5BSO, respectively, over cable 116. Relays 6E0–6E7 are connected over cable 611 through the contacts of relay 22D, cable 222 to relay 5CSO. Storage relays 6F0–6F7 are likewise connected through the contacts of relay 22D over cable 223 to relay 5DSO. The contacts of relays 6G0–6G7 are connected through relay 22D to the contacts of relay 4ESO over cable 224. In a similar manner relays 6G0–6G7, 6M0–6H7, 6J0–6J7, 3K0–3K7 and 3L0–3L7 are respectively connected to out-steering relays 4FSO, 4GSO, 5HSO and 5JSO.

Of the remaining two direct-current digits the next-to-last digit stored in relays 1D0–1D7 is transferred over cable 117, the contacts of relay 22D and cable 225 to relay 5KSO and the remaining direct-current digit stored in relays 1C0–1C7 is transmitted over cable 118, contacts of relay 22D and cable 223 to relay 5DSO.

The eleven out-steering relays 5ASO through 5LSO are now operated in sequence to connect to an outpulsing circuit 411 (shown in outline form) in a manner described in detail in the McKim et al. patent. The operation of relays 5ASO–5LSO in sequence is shown symbolically by selector switch 412. Relays 4OD1 and 4EV1 alternately connect the outsteering relays to the outpulsing circuit in conventional manner as shown in McKim et al. It is apparent, however, that the sequence of storage in relays 5ASO through 5LSO accurately reflects the order in which the digits were dialed by the calling subscriber. In this manner the instant arrangement has performed the requisite function of storage of the digits in incoming registers in an order which departs from that used by the calling subscriber but has permitted outpulsing of the digits in the appropriate sequence.

Having thus explained the structural and functional relation of the invention in general form, a detailed description of the operation for each possible combination of direct and multifrequency current digits follows.

DETAILED DESCRIPTION

As an illustration of the operation of the present arrangement it will be assumed, as indicated above, that a tandem call has been originated by a calling subscriber at substation 710 who seeks to effect a connection to a called subscriber at substation 711. As indicated in the General Description, the calling subscriber's substation 710 is extended to originating local office 713 and the subscriber is permitted to begin dialing. Equipment in originating local office 713 is activated to store the dialed digits in accordance with my application Serial No. 590,665, filed June 11, 1956. For purposes of illustration it will be assumed that the called directory number is 77449922345.

In due course, the incoming trunk circuit 714 at the tandem office is seized and a path is established to connect the incoming sender 717 to incoming trunk circuit 714.

The equipment in the local office 713 is then operated, in the manner described in my previous application, to permit the subscriber to dial directly over the trunk between the local office and the tandem office into D.C. receiver 719.

Also the initial digits dialed by the calling subscriber, which were expended or "lost" in reaching the outgoing trunk circuit (not shown) to tandem and pulsed forward in the manner shown in my above-referred-to application, are stored in the M.F. receiver 720 of incoming sender 717.

As explained above, the total number of digits of both types which will be transmitted to the tandem office will in no event exceed a fixed number—in this case 11. However, the number of digits of each type which may be transmitted to represent a particular directory number may, and in fact does, vary in accordance with the number of digits expended at the originating office in reaching an outgoing toll trunk. The variation is permitted to encompass maximum and minimum boundaries defined heretofore. Thus, in the following explanation, examples will be given covering those instances in which the said directory number, i.e., 77449922345, is transmitted but the number of multifrequency digits varies between 2 and 4 and the number of direct-current pulsed digits correspondingly varies between 9 and 7, respectively.

It has thus far been assumed that a connection has been established from the originating local office to the multifrequency receiver 720 and the D.C. receiver 719 of the incoming sender 717. The manner of storage of the called directory number in the digit register 721 will now be described.

IN-STEERING—2 M.F. DIGITS AND 9 D.C. DIGITS

The M.F. digits which signify the digits dialed by the calling subscriber in reaching the outgoing trunk to tandem and one additional digit dialed into the trunk while awaiting connection of the receiver at tandem, are transmitted, as explained in my previous application, and received in M.F. receiver 720 shown in FIG. 1. The multifrequency pulse receiving circuit operates in a well-known manner explained by McKim et al., to supply pulses of current on a two-out-of-five code basis to conductors 110–114. For detailed explanation of the two-out-of-five code, reference may be made to "The Design of Switching Circuits" by Keister et al., 1951.

As shown by McKim et al., the first multifrequency digit, which in this case is 7, corresponding to the energization of leads 1010 and 1017, are extended over the contacts of relay 1SV1, conductors 1020 and 1027, contacts of relay 1ASMF and operating windings of relays 1A0 and 1A7, which relays operate to store the digit 7. In this respect, relay 1ASMF has previously been operated in response to the seizure of the incoming trunk at the tandem office in a manner explained by McKim et al. and which is shown symbolically in FIG. 1 by the operation of selector 115 to the No. 1 terminal position to operate relay 1ASMF.

Through the alternate operations of relays 1EV1 and 1OD1 in a well-known manner explained by McKim et al. the output of the multifrequency receiver 720 is extended to conductors 1020–1027 and conductors 1030–1037 to store the multifrequency digits.

As indicated above in the general description, when the first M.F. digit is stored, selector 115 proceeds to position 2 to operate relay 1BSMF in a manner similar to that shown in the McKim et al. patent. Relays 1A0 and 1A7 remain operated over an obvious locking path. The operation of relay 1BSMF in consequence of the advance of selector 115 to position No. 2 completes a circuit for the storage of the second multifrequency digit 7 over conductors 1010 and 1017, contacts of relay 1OD1, conductors 1030 and 1037, contacts of relay 1BSMF, windings of relays 1B0 to 1B7 to negative battery. Relays 1B0 and 1B7 lock operated to store the second M.F. digit.

The storage of the second M.F. digit results in the advance of selector 115 to position 3 to operate relay 1CSMFD. At this time relay 22D operates over a path including negative battery, winding of relay 22D, conductor 2D, cable 211, conductor 2D, No. 6 contact of relay 1CSMFD, conductor ON, cable 211, conductor ON, contacts of relay 2ON to ground.

Thus far, the two assumed M.F. digits have been stored in the regularly assigned registers 1A0–1A7 and 1B0–1B7 and it now remains to store the nine direct-current digits comprising the last nine digits of the called directory number. In accordance with the description given in my above-referred-to copending application, it is understood that these direct-current digits may be received simultaneously in point of time with the above-referred-to M.F. digits. These D.C. digits are received in D.C. receiver 719 which may illustratively be similar to that shown in Patent No. 2,722,675 of J. Michal of November 1, 1955.

The D.C. receiver 719, shown in outline form in FIG. 3, is adapted to count the dialed digits and energize conductors 3010–3017 in the two-out-of-five code in accordance with the digits called.

The first direct-current digit, which is assumed to be a 4, will result in the energization of conductors 3010 and 3014 representing a 4 in the two-out-of-five code. A path for the storage of the first D.C. digit is extended over the contacts of relay 3EV, conductors 3020 and 3024, contacts of relay 6ASD, windings of relays 6E0 and 6E4 which operate to store the first D.C. digit 4.

The manner of operation of steering relays 5ASD–6ESD and 3FSD–3JSD is similar to that described in McKim et al. for the operation of relays 1ASMF, 1BSMF, etc., and is also described in the above-referred-to patent of J. Michal. In the instant arrangement, the successive operation of relays 6ASD, 6BSD, etc. is shown symbolically through the operation of selector 310. Thus it has been assumed that when the sender link is seized, relay 6ASD is operated by the advance of selector 310 to position No. 1. When the first D.C. digit is stored, selector 310 advances to position 2 and relay 6BSD is operated.

The second D.C. digit 4 may now be stored over a path including conductors 3010 and 3014, contacts of relay 3OD, conductors 3030 and 3034, contacts of relay 6BSD and windings of relays 6F0 and 6F4 which operate to store the second D.C. digit 4.

In a similar manner, the alternate operation of relays 3OD and 3EV and the advance of selector 310 to position No. 3 will connect the third D.C. digit over the contacts of relay 6CSD. Since the third D.C. digit is a 9, relays 6G2 and 6G7 operate to store the third digit.

Also in a similar manner, relays 6H2 and 6H7 operate to store the fourth D.C. digit which is a 9, relays 6J0 and 6J2 operate to store the fifth D.C. digit which is a 2, relays 3K0 and 3K2 operate to store the sixth D.C. digit which is a 2, and relays 3L1 and 3L2 operate to store the seventh D.C. digit which is a 3.

It may now be seen that the first two M.F. digits and the first seven D.C. digits have been stored but the remaining two direct-current digits cannot be stored in the seven registers reserved exclusively for direct-current digits since they have already been filled.

In consequence, when steering relay 3HSD was operated through the advance of selector 310 to position 8 after the storage of the seventh direct-current digit, a circuit is extended over the contacts of relay 3HSD to store the eighth direct-current digit which is a 4. This circuit may be traced from conductors 3010 and 3014, contacts of relay 3OD, conductors 3030 and 3034, contacts of relay 3HSD, conductors 3040 and 3044, cable 330, conductors 3040 and 3044, cable 330, conductors 3040 and 3044, seen on FIG. 2, of which only conductor 3040 is shown, contacts 100 and 104 of relay 22D of which only contact 100 is shown, conductors 2040 and 2044 of which only conductor 2040 is shown, cable 232, and conductors 2040 and 2044, seen in FIG. 1, to the windings of relays 1D0 and 1D4.

It should be particularly noted with regard to FIG. 2 that, for purposes of simplification, only two of the five conductors and associated contacts have been shown in each instance with the exception of conductors 3050–3057 and contacts 110–117. For example, with regard to conductors 3040 and 3047, respectively connected to contacts 100 and 107 of relay 22D, it will be appreciated that these conductors and contacts are intended to represent and include the remaining three conductors and contacts in the group, i.e., conductors 3041, 3042 and 3044, and contacts 101, 102 and 104.

In the discussion hereinafter, it will be assumed that the intermediate conductors and contacts are present when tracing a path through FIG. 2 although they are not expressly shown.

It will also be noted that the last digit of each group of conductors, contacts, relays, etc., represents the particular two-out-of-five code that the element represents.

In a manner similar to that described above for the operation of relay 3HSD, relay 3JSD operates on the advance of selector 310 to position 9 and the ninth D.C. digit is transferred over the contacts of relay 3JSD, conductors 3051 and 3054, cable 330, conductors 3051 and 3054, contacts 111 and 114 of relay 22D, conductors 2051 and 2054, cable 243 and conductors 2051 and 2054 to the windings of relays 1C0–1C7. Since the ninth D.C. digit is a 5, relays 1C1 and 1C4 operate to store the ninth D.C. digit.

At this time all of the multifrequency and direct-current digits have been stored as recapitulated in the following Table I.

*Table I* (*Directory Number 77449922345*)

| Storage relays: | Digit Stored |
|---|---|
| 1A0–1A7 | 1st M.F. (7) |
| 1B0–1B7 | 2nd M.F. (7) |
| 1C0–1C7 | 9th D.C. (5) |
| 1D0–1D7 | 8th D.C. (4) |
| 6E0–6E7 | 1st D.C. (4) |
| 6F0–6F7 | 2nd D.C. (4) |
| 6G0–6G7 | 3rd D.C. (9) |
| 6H0–6H7 | 4th D.C. (9) |
| 6J0–6J7 | 5th D.C. (2) |
| 3K0–3K7 | 6th D.C. (2) |
| 3L0–3L7 | 7th D.C. (3) |

OUT-STEERING TWO—M.F. DIGITS AND 9 D.C. DIGITS

The information stored in the eleven relays 1A0–1A7 through 3L0–3L7 representing the called directory number is now transferred through the out-steering register relays 5ASO–5LSO, inclusive, in appropriate sequence for transfer to the outpulser in the order in which the directory number was originally dialed by the calling subscriber.

Relays 5ASO–5LSO operate in sequence as explained in detail in McKim et al. In the instant arrangement, the successive operation of relays 5ASO–5LSO is shown symbolically through the advance of selector 412.

When relay 5ASO operates in consequence of the advance of selector 412 to position No. 1, a circuit is extended over the contacts of relay 5ASO which will be traced from the operated contacts of relays 1A0 and 1A7 over conductors 1040 and 1047, cable 116, conductors 1040 and 1047, contacts of relay 5ASO, conductors 5010 and 5017, contacts of relay 4OD1, and conductors 4010 and 4017 to the outpulser 411. The sequential alternate operation of relays 4OD1 and 4EV1 is similar to the operation of relays 1OD1, 1EV1, 3OD and 3EV referred to above.

From the outpulser 411 the digits are further transferred, as indicated in McKim et al., over the sender link and connector 718, the incoming trunk circuit 714, the link circuits 724 and 725 and the outgoing trunk circuit 723 to the terminating local office 712.

After the first digit has been transmitted relay 5BSO is operated as indicated in McKim et al. and shown herein symbolically by the advance of selector 412 to position No. 2. A circuit may now be traced from the relays 1B0 and 1B7 over conductors 1050 and 1057, cable 116, conductors 1050 and 1057, contacts of relay 5BSO, conductors 5020 and 5027, contacts of relay 4EV1 and conductors 4010 and 4017 to the outpulser 411.

Selector 412 now advances to position No. 3 whereby relay 5CSO is operated and a path may be traced over the contacts of relay 5CSO from relays 6E0 and 6E4 over conductors 6010 and 6014, cable 611, conductors 6010 and 6014, contacts 70 and 74 of relays 22D, conductors 2060 and 2064, cable 222, conductors 2060 and 2064, contacts of relay 5CSO, conductors 5010 and 5014, contacts of relay 4OD1, and conductors 4010 and 4014 to the outpulser 411.

After the transmission of the third digit (the first D.C. digit), selector 412 advances to position 4 and a path is prepared over the contacts of relays 6F0 and 6F4 over conductors 630–637, cable 611, conductors 630–637, contacts 60–67 of relay 22D, conductors 250–257, cable 223, conductors 250–257, conductors 5020–5027, and conductors 4010–4017 to the outpulser 411. Since the digit stored in relays 6F0–6F7 was a 4, relays 6F0 and 6F4 were operated, extending the path over conductors 630 and 634, cable 611, conductors 630 and 634, conductors 250 and 254, contacts of relay 5DSO, conductors 5020 and 5024, and conductors 4010 and 4014 to the outpulser 411.

The transmission of the fourth digit results in the advance of selector 412 to position No. 5 where a path is closed for the operation of relay 4ESO. A circuit may now be traced from the contacts of relays 6G0–6G7 (in which group relays 6G2 and 6G7 were previously operated) over conductors 642 and 647, cable 611, conductors 642 and 647, contacts 52 and 57 of relay 22D, conductors 262 and 267, cable 224, conductors 262 and 267, contacts of relay 4ESO, conductors 5012 and 5017, and conductors 4012 and 4017 to the outpulser 411.

When the fifth digit is transmitted, selector 412 advances to position No. 6 and relay 4FSO is operated. In a manner similar to that described above, a circuit may be traced from the contacts of relays 6H0–6H7 over cable 635, contacts 40–47 of relay 22D, cable 224, contacts of relay 4FSO, and contacts of relay 4OD1 to the outpulsing circuit. In a similar manner the remaining digits stored in relays 6J0–6J7, 3K0–3K7 and 3L0–3L7 are respectively transferred over the contacts of relay 22D and the contacts of relay 4GSO, 5HSO and 6JSO, respectively, to the outpulsing circuit. Thus far, the first two M.F. digits and the first seven D.C. digits have been transferred to the outpulsing circuit. When selector 412 advances to position No. 10, relay 5KSO operates and extends a path from the contacts of relays 1D0–1D7 over cable 117, contacts 80–87 of relay 22D, conductors 2070–2077, cable 225, and contacts of relay 5KSO to the outpulsing circuit.

After the transmission of the tenth digit (eighth direct-current digit) selector 412 advances to position 11 and a path is completed for the operation of relay 5LSO. At this time a path may be traced from the contacts of relays 1C0–1C7 over cable 118, contacts 90–97 of relay 22D, conductors 280–287, cable 225, and contacts of relay 5LSO to the outpulsing circuit.

Thus, as shown in the following Table II, the digits stored in relays 1A0–1A7 through 3L0–3L7 have been outpulsed in the proper order, i.e., the sequence in which the digits were dialed by the calling subscriber at substation 710.

*Table II* (*Directory Number 77449922345*)

| Storage Relays | Digit Stored | Outpulsed Via Relay |
|---|---|---|
| 1A0-1A7 | 1st M.F. | 5ASO |
| 1B0-1B7 | 2nd M.F. | 5BSO |
| 1C0-1C7 | 9th D.C. | 5LSO |
| 1D0-1D7 | 8th D.C. | 5KSO |
| 6E0-6E7 | 1st D.C. | 5CSO |
| 6F0-6F7 | 2nd D.C. | 5DSO |
| 6G0-6G7 | 3rd D.C. | 4ESO |
| 6H0-6H7 | 4th D.C. | 4FSO |
| 6J0-6J7 | 5th D.C. | 4GSO |
| 3K0-3K7 | 6th D.C. | 5HSO |
| 3L0-3L7 | 7th D.C. | 5JSO |

IN-STEERING — THREE MULTIFREQUENCY DIGITS AND EIGHT DIRECT-CURRENT DIGITS

Again it will be assumed for illustrative purposes that the directory number to be received at the tandem office and retransmitted to the terminating office is 77449922345. As before, the M.F. digits which signify those expended by the calling subscriber in reaching the outgoing trunk to tandem and one additional digit dialed into the trunk while awaiting connection of the tandem receiver are received in M.F. receiver 720, shown in FIG. 1. The M.F. receiver functions as before to receive the three M.F. digits and to supply appropriate pulses of current in the two-out-of-five code to conductors 1010–1017.

As shown by McKim et al., the first M.F. digit 7 corresponding to the energization of leads 1010 and 1017 are extended over the contacts of relay 1EV1, conductors 1020 and 1027, contacts of relay 1ASMF, operating windings of relays 1A0 and 1A7 which collectively store the digit 7.

Through the alternate operations of relays 1EV1 and 1OD1, as indicated above, the remaining multifrequency digits are stored in relays 1B0 and 1B7 to represent the second M.F. digit 7, and in relays 1C0 and 1C4 to signify the third M.F. digit 4. At this time, selector 115 has advanced to position No. 4 to operate relay 1DSMFD. In consequence, relay 23D is operated at the No. 6 contacts of relay 1DSMFD over a circuit which may be traced from negative battery, operating winding of relay 23D, conductor 3D, cable 211, conductor 3D, No. 6 contacts of relay 1DSMFD, conductor ON, cable 211, conductor ON, and contacts of relay 2ON to ground.

Thus, with the three M.F. digits stored in registers 1A0–1A7 through 1C0–1C7, it is now necessary to store the remaining eight direct-current digits which comprise the last eight digits of the called directory number. As explained above, these direct-current digits may be received simultaneously with the M.F. digits. The D.C. digits are received in D.C. receiver 719 shown in outline form in FIG. 3, which counts the digits as they arrive and energizes two-out-of-five of the conductors 3010–3017 in accordance with the digits dialed.

The first direct-current digit assumed to be a 4 will result in the energization of conductors 3010 and 3014 representing a 4 in the two-out-of-five code. As before, the storage of the first D.C. digit may be traced over the contacts of relay 3EV, conductors 3020 and 3024, contacts of relay 6ASD, windings of relays 6E0 and 6E4 which operate to store the first D.C. digit 4.

The successive operation of steering relays 6ASD–6ESD and 3FSD and 3GSD in consequence of the advance of selector 310, results in the sequential storage of the D.C. digits in remaining registers 6F0–6F7 through 6J0–6J7, 3K0–3K7 and 3L0–3L7.

Thus, the second D.C. digit which is a 9 is stored over a path including conductors 3012 and 3017, contacts of relay 3OD, conductors 3032 and 3037, contacts of relay 6BSD, windings of relays 6F2 and 6F7 to store the digit 9.

Similarly, the advance of selector 310 to position No. 3 will transfer the third D.C. digit 9 over the contacts of relay 6CSD to operate relays 6G2 and 6G7.

It is now apparent that relays 6H0 and 6H2 will operate to store the fourth D.C. digit 2 when selector 310 advances to position No. 4 and relays 6J0 and 6J2 operate to store the fifth D.C. digit 2 when selector 310 advances to position No. 5.

Relays 3K1 and 3K2 operate to store the sixth D.C. digit 3 when the selector advances to position 6, and relays 3L0 and 3L4 operate to store the digit 4 when selector 310 advances to position 7.

At this time, the first three M.F. digits and the first seven D.C. digits have been stored but the remaining D.C. digit cannot be stored in the seven registers exclusively assigned to D.C. digits since they have been filled.

Thus, when selector 310 advances to position No. 8 to operate relay 3HSD after the storage of the seventh D.S. digit in relays 3L0 and 3L4, a circuit is completed over the contacts of relay 3HSD, conductors 3040–3047, cable 330, conductors 3040–3047, contacts 100–107 of relay 23D, conductors 2040–2047, cable 232, and conductors 2040–2047 to the windings of relays 1D0–1D7. In the assumed illustration, the eighth D.C. digit is a 5 and, in consequence, conductors 2041 and 2044 will be energized to operate relays 1D1 and 1D4.

It may now be seen that all of the M.F. and D.C. digits have been stored as demonstrated in the following Table III.

*Table III (Directory Number 77449922345)*

| Storage relays: | Digit stored |
|---|---|
| 1A0–1A7 | 1st M.F. (7) |
| 1B0–1B7 | 2nd M.F. (7) |
| 1C0–1C7 | 3rd M.F. (4) |
| 1D0–1D7 | 8th D.C. (5) |
| 6E0–6E7 | 1st D.C. (4) |
| 6F0–6F7 | 2nd D.C. (9) |
| 6G0–6G7 | 3rd D.C. (9) |
| 6H0–6H7 | 4th D.C. (2) |
| 6J0–6J7 | 5th D.C. (2) |
| 3K0–3K7 | 6th D.C. (3) |
| 3L0–3L7 | 7th D.C. (4) |

OUT-STEERING — THREE MULTIFREQUENCY AND EIGHT DIRECT-CURRENT DIGITS

The information stored in relays 1A0–1A7 through 3L0–3L7 representing the called directory number is now arranged for transfer through recapture relays 5ASO–5LSO in appropriate sequence for outpulsing in the order in which the directory number was originally dialed by the calling subscriber.

As above, relays 5ASO–5LSO operate in sqeuence through the advance of selector 412.

When relay 5ASO operates on the advance of selector 412 to position No. 1, a circuit is completed over the contacts of relay 5ASO which may be traced from the operated contacts of relays 1A0–1A7, conductors 1040–1047, cable 116, conductors 1040–1047, contacts of relay 5ASO, conductors 5010–5014, contacts of relay 4OD1, and conductors 4010–4017 to the outpulser 411.

From the outpulser 411 the digits are further transferred as shown in the McKim et al. patent over the sender link and connector 718, the incoming trunk circuit 714, the link circuits 724 and 725 and the outgoing trunk circuit 723 to the terminating local office 712.

Figure 5:
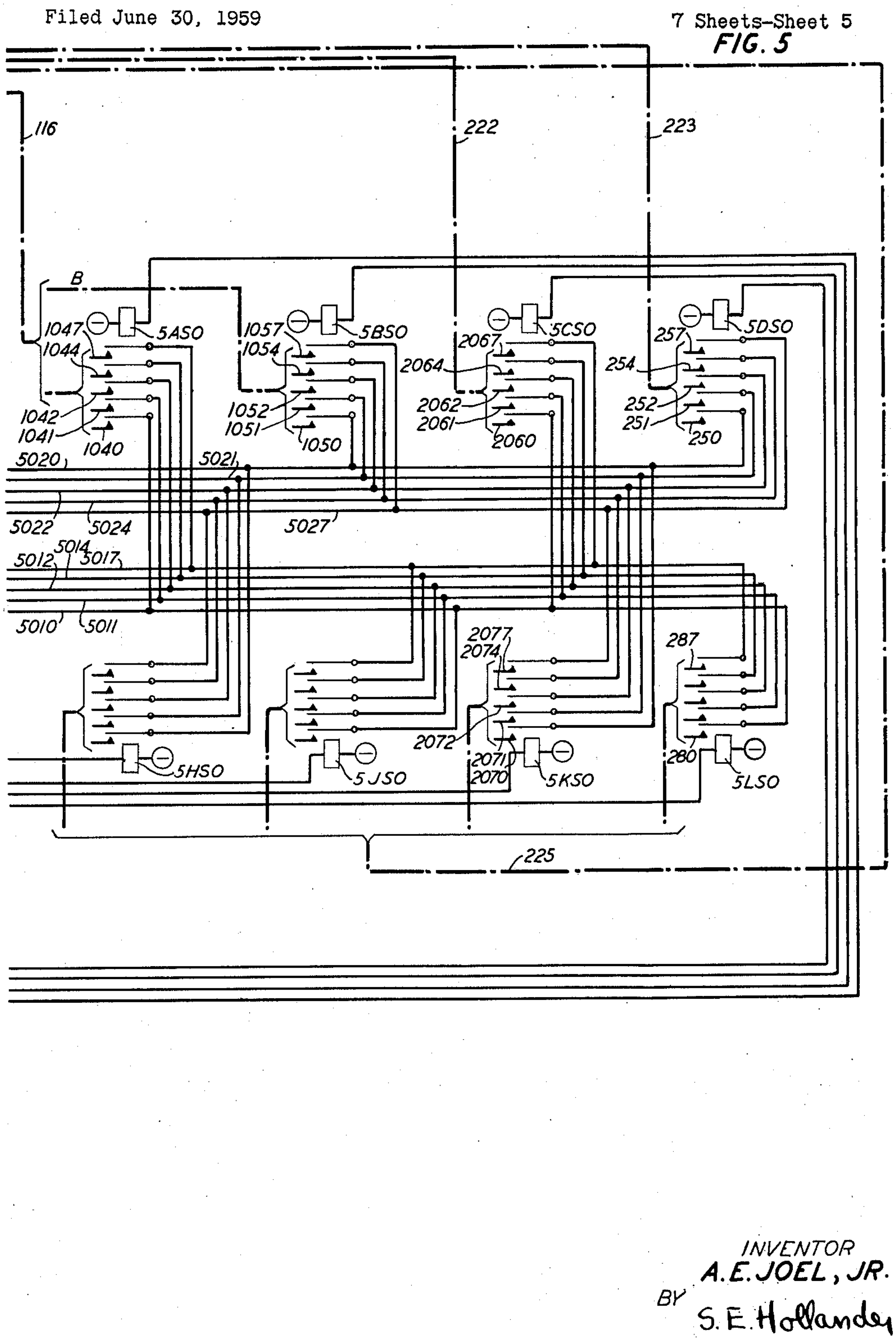

Since the digit 7 was stored in relays 1A0 and 1A7, conductors 1040 and 1047 are energized in FIG. 5 and, in turn, energize conductors 5010 and 5017 over the contacts of relay 5ASO and conductors 4010 and 4017 over the contacts of relay 4OD1 to transfer the digit 7 to the outpulser 411.

After the first digit 7 has been transmitted, relay 5BSO is operated by the advance of selector 412 to position No. 2. A circuit now extends from the contacts of relays 1B0 and 1B7 (which stored a digit 7), conductors 1050–1057, cable 116, conductors 1050–1057, contacts of relay 5BSO, conductors 5020–5027, contacts of relay 4EV1, and conductors 4010–4017 to the outpulser 411. Since relays 1B0 and 1B7 were operated, conductors 1050 and 1057 are energized and, in turn, energize conductors 5020 and 5027, and 4010 and 4017 to outpulser 411. The second M.F. digit 7 is now transmitted by the outpulser in the manner explained above.

Selector 412 now advances to position No. 3, whereupon relay 5CSO is operated to extend the path from relays 1C0–1C7 over conductors 150–157, cable 118, conductors 150–157, contacts 90–97 of relay 23D, conductors 2060–2067, cable 222, conductors 2060–2067, contacts of relay 5CSO, conductors 5010–5017, contacts of relay 4OD1, and conductors 4010–4017 to the outpulsing circuit 411. Since relays 1C0 and 1C4 were operated, it may be seen that conductors 4010 and 4014 are energized to the outpulser 411.

After the transmission of the third M.F. digit, selector 412 advances to position No. 4 and a path is prepared over the contacts of relays 6E0–6E7 which store the first D.C. digit, conductors 6010–6017, cable 611, conductors 6010–6017, contacts 70–77 of relay 23D, conductors 250–257, cable 223, conductors 250–257, contacts of relay 5DSO, conductors 5020–5027, contacts of relay 4EV1, and conductors 4010–4017 to the outpulser 411. Since the first D.C. digit was a 4, conductors 4010 and 4014 are energized to the outpulser 411 to represent the digit 4.

The fourth digit (first D.C. digit) has now been transmitted and results in the advance of selector 414 to position No. 5 to operate relay 4ESO. A circuit may now be traced over the contacts of relays 6F0–6F7, conductors 630–637, cable 611, conductors 630–637, contacts 60–67 of relay 23D, conductors 260–267, cable 224, conductors 260–267, contacts of relay 4ESO, conductors 5010–5014, contacts of relay 4OD1, and conductors 4010–4017 to the outpulsing circuit 411. Since the second D.C. digit is a 9, conductors 4012 and 4017 are energized to the outpulser to signify the digit 9 in the two-out-of-five code.

The transfer of the second D.C. digit to the outpulser results in the transmission of the fifth digit of the directory number and selector 412 advances to position No. 6 to operate relay 4FSO. In a manner similar to that traced above, a circuit may be traced from the contacts of relays 6G0–6G7, conductors 640–647, cable 611, conductors 640–647, contacts 50–57 of relay 23D, conductors 270–277, cable 224 conductors 270–277, contacts of relay 4FSO, conductors 5020–5027, and contacts of relay 4EV1, conductors 4010–4017 (of which 4012 and 4017 are energized to represent the digit 9) to the outpulsing circuit.

In a similar manner, the remaining digits stored in relays 6H0–6H7, 6J0–6J7, 3K0–3K7, and 3L0–3L7 are transferred over the contacts of relay 23D and the contacts of relays 4GSO, 5HSO, 5JSO, and 5KSO, respectively, to the outpulsing circuit.

In summary, thus far the three M.F. digits and the first seven D.C. digits have been transferred to the outpulsing circuit. When selector 412 advances to position No. 11, a path may be traced over the contacts of relay 5LSO from the contacts of relays 1D0–1D7, conductors 1060–1067, cable 117, contacts 80–87 of relay 23D, conductors 280–287, cable 225, conductors 280–287, contacts of relay 5LSO, conductors 5010–5017, contacts of relay 4OD1, conductors 4010–4017 (of which 4011 and 4014 are energized to signify the digit 5), and outpulser 411 to the distant office.

At this time, and as shown in the following summary in Table IV, the digits stored in relays 1A0–1A7 through 3L0–3L7 have been outpulsed in the order in which the digits were dialed by the calling subscriber.

*Table IV (Directory Number 77449922345)*

| Storage Relays | Digit Stored | Outpulsed Via Relay |
|---|---|---|
| 1A0–1A7 | 1st M.F. | 5ASO |
| 1B0–1B7 | 2nd M.F. | 5BSO |
| 1C0–1C7 | 3rd M.F. | 5CSO |
| 1D0–1D7 | 8th D.C. | 5LSO |
| 6E0–6E7 | 1st D.C. | 5DSO |
| 6F0–6F7 | 2nd D.C. | 4ESO |
| 6G0–6G7 | 3rd D.C. | 4FSO |
| 6H0–6H7 | 4th D.C. | 4GSO |
| 6J0–6J7 | 5th D.C. | 5HSO |
| 3K0–3K7 | 6th D.C. | 5JSO |
| 3L0–3L7 | 7th D.C. | 5KSO |

IN-STEERING—FOUR MULTIFREQUENCY DIGITS AND SEVEN DIRECT-CURRENT DIGITS

As before, the assumed directory number is 77449922345 and the M.F. digits which the calling subscriber dialed in reaching the outgoing trunk and one additional digit dialed into the trunk while awaiting connection of the tandem receiver are transmitted into M.F. receiver 719.

The first M.F. digit which is a 7 corresponds to the energization of leads 1010 and 1017, and as explained above, operates relays 1A0 and 1A7 over the contacts of relays 1EV1 and 1ASMF. In a similar manner, the second M.F. digit 7 is stored in relays 1B0 and 1B7 over relays 1OD1 and 1BSMF. The third and fourth M.F. digits (4 and 4) are similarly stored in relays 1C0 and 1C4 and 1D0 and 1D4.

On the advance of selector 115 to position No. 5 after the storage of the fourth M.F. digit in relays 1D0 and 1D4, relay 1RST operates over an obvious path. The contacts of relay 1RST extend a circuit for the operation of relay 24D which may be traced from negative battery, winding of relay 24D, conductor 4D, cable 211, conductor 4D, contacts of relay 1RST, conductor ON, cable 211, conductor ON, and contacts of relay 2ON to ground.

Thus far, the four multifrequency digits have been stored in registers 1A0–1A7 through 1D0–1D7 and the manner in which the remaining seven direct-current digits are stored will now be examined.

The D.C. receiver 719 shown in outline form in FIG. 3, counts the D.C. dialed digits and energizes conductors 3010–3017 in the two-out-of-five code in accordance with the digits dialed. The first direct-current digit which is assumed to be a 9 will result in the energization of conductors 3012 and 3017 and operate relays 6E2 and 6E7 over the contacts of relay 3EV, conductors 3027 and 3022, and the contacts of relay 6ASD.

In the manner explained above, relays 6ASD–6ESD are operated in accordance with the sequential operation of relays 3OD and 3EV to store the second, third, fourth and fifth D.C. digits in relays 6F2 and 6F7 (9), 6G0 and 6G2 (2), 6H0 and 6H2 (2), 6J1 and 6J2 (3), respectively. Also, relays 6K0 and 6K4 are operated to store the 6th D.C. digit which is a 4 and relays 3L1 and 3L4 are operated to store the last D.C. digit 5.

Under these circumstances, it is apparent that all of the M.F. digits and all of the D.C. digits have been stored without recourse to the in-steering circuit of FIG. 2. The manner and location of storage of the M.F. and D.C. digits are recapitulated in the following Table V.

*Table V (Directory Number 77449922345)*

| Storage relays: | Digit stored |
|---|---|
| 1A0–1A7 | 1st M.F. (7) |
| 1B0–1B7 | 2nd M.F. (7) |
| 1C0–1C7 | 3rd M.F. (4) |
| 1D0–1D7 | 4th M.F. (4) |
| 6E0–6E7 | 1st D.C. (9) |
| 6F0–6F7 | 2nd D.C. (9) |
| 6G0–6G7 | 3rd D.C. (2) |
| 6H0–6H7 | 4th D.C. (2) |
| 6J0–6J7 | 5th D.C. (3) |
| 3K0–3K7 | 6th D.C. (4) |
| 3L0–3L7 | 7th D.C. (5) |

OUT-STEERING—FOUR MULTIFREQUENCY DIGITS AND SEVEN DIRECT-CURRENT DIGITS

The information stored in the 11 relays, 1A0–1A7 through 3L0–3L7, representing the called directory number is transferred through relays 5ASO–5LSO, inclusive, for transmission by outpulser 411 in proper sequence.

When relay 5ASO operates, in consequence of the advance of selector 412 to position No. 1, a circuit is extended over the contacts of relay 5ASO which may be traced from the contacts of relays 1A0 and 1A7, conductors 1040 and 1047, cable 116, conductors 1040 and 1047, contacts of relay 5ASO, conductors 5010 and 5017, contacts of relay 4OD1 and conductors 4010 and 4017 to the outpulser 411.

After the first digit has been transmitted, relay 6BSO is operated by virtue of the advance of selector 412 to position No. 2. A circuit may now be traced from conductors 1050 and 1057 at the contacts of relays 1B0 and 1B7, cable 116, conductors 1050 and 1057, contacts of relay 5BSO, conductors 5020 and 5027, contacts of relay 4EV1, and conductors 4010 and 4017 to the outpulser 411.

Selector 412 now advances to position No. 3 and relay 5CSO is operated over a path which may be traced from relays 6C0 and 6C4, conductors 150 and 154, cable 118, conductors 150 and 154, contacts 90 and 94 of relay 24D, conductors 2060 and 2064, cable 222, conductors 2060 and 2064, contacts of relay 5CSO, conductors 5010 and 5014, contacts of relay 4OD1, and conductors 4010 and 4014 to the outpulser 411.

Selector 412 next advances to position No. 4 to operate relay 5DSO and extend a path from the contacts of relays 1D0 and 1D4, conductors 1060 and 1064, cable 117, contacts 80 and 84 of relay 24D, conductors 250 and 254, contacts of relay 5DSO, conductors 5020 and 5024, contacts of relay 4EV1, and conductors 4010 and 4014 to the outpulser 411.

The transmission of the fourth digit results in the advance of selector 412 to position No. 5 where a path is prepared for the operation of relay 4ESO and the recapture of the first D.C. digit. A circuit may now be traced from the contacts of relay 6E2 and 6E7 over conductors 6012 and 6017, cable 611, conductors 6012 and 6017, contacts 72 and 77 of relay 24D, conductors 262 and 267, cable 224, conductors 262 and 267, contacts of relay 4ESO, conductors 5012 and 5017, contacts of relay 4OD1, and conductors 4012 and 4017 to outpulser 411.

Transmission of the fifth digit advances selector 412 to position No. 6 and relay 4FSO is operated. In a manner similar to that described above, a circuit may be traced from the contacts of relays 6F2 and 6F7, conductors 632 and 637, cable 611, conductors 632 and 637, contacts 62 and 67 of relay 24D, conductors 272 and 277, cable 224, conductors 272 and 277, contacts of relay 4FSO, conductors 5022 and 5027, contacts of relay 4EV1, and conductors 4012 and 4017 to the outpulser 411.

Also in a similar manner, the remaining digits stored in relays 6G0–6G7 through 6J0–6J7 are transferred over the contacts of relay 24D and the contacts of relays 4GSO, 5HSO and 5JSO, respectively, to the outpulser 411.

The remaining two D.C. digits stored in relays 3KO–3K7 and relays 3LO–3LS are transferred over the appropriate contacts of relay 24D and the contacts of relays 5KSO and 5LSO, respectively, to the outpulser 411.

Thus, as shown in the following Table VI, the digits stored in relays 1A0–1A7 through 3L0–3L7 have been outpulsed in the desired sequence, i.e., the order in which the digits were dialed by the calling subscriber at substation 710.

*Table VI*

| Storage Relays | Digit Stored | Outpulsed Via Relay |
|---|---|---|
| 1A0–1A7 | 1st M.F. | 5ASO |
| 1B0–1B7 | 2nd M.F. | 5BSO |
| 1C0–1C7 | 3rd M.F. | 5CSO |
| 1D0–1D7 | 4th M.F. | 5DSO |
| 6E0–6E7 | 1st D.C. | 4ESO |
| 6F0–6F7 | 2nd D.C. | 4FSO |
| 6G0–6G7 | 3rd D.C. | 4GSO |
| 6H0–6H7 | 4th D.C. | 5HSO |
| 6J0–6J7 | 5th D.C. | 5JSO |
| 3K0–3K7 | 6th D.C. | 5KSO |
| 3L0–3L7 | 7th D.C. | 5LSO |

After the transmission of the eleventh digit, in each instance, the call is completed as described in the General Description and the incoming sender is released releasing off-normal relay 2ON. In doing so, the holding ground which extended over conductor 2ON is removed and the locking contacts of each of the storage relays previously operated are released in view of the interruption of the obvious holding path therefor.

Although it is contemplated that the sequence of operation of relays 1ASMF through 1DSMFD will illustratively be in accordance with that shown in the patent to McKim et al. and the sequence of advance of relays 6ASD–6ESD and 6FSD–6JSD will be illustratively similar to that shown in the patent to J. Michal, other arrangements may be substituted without departing from the scope of the invention. For example, these relays may be controlled by selectors 310 and 115 which, in turn, are operated by a suitable control circuit which is responsive to clock-timing pulses or to a programmed function.

Figure 4:
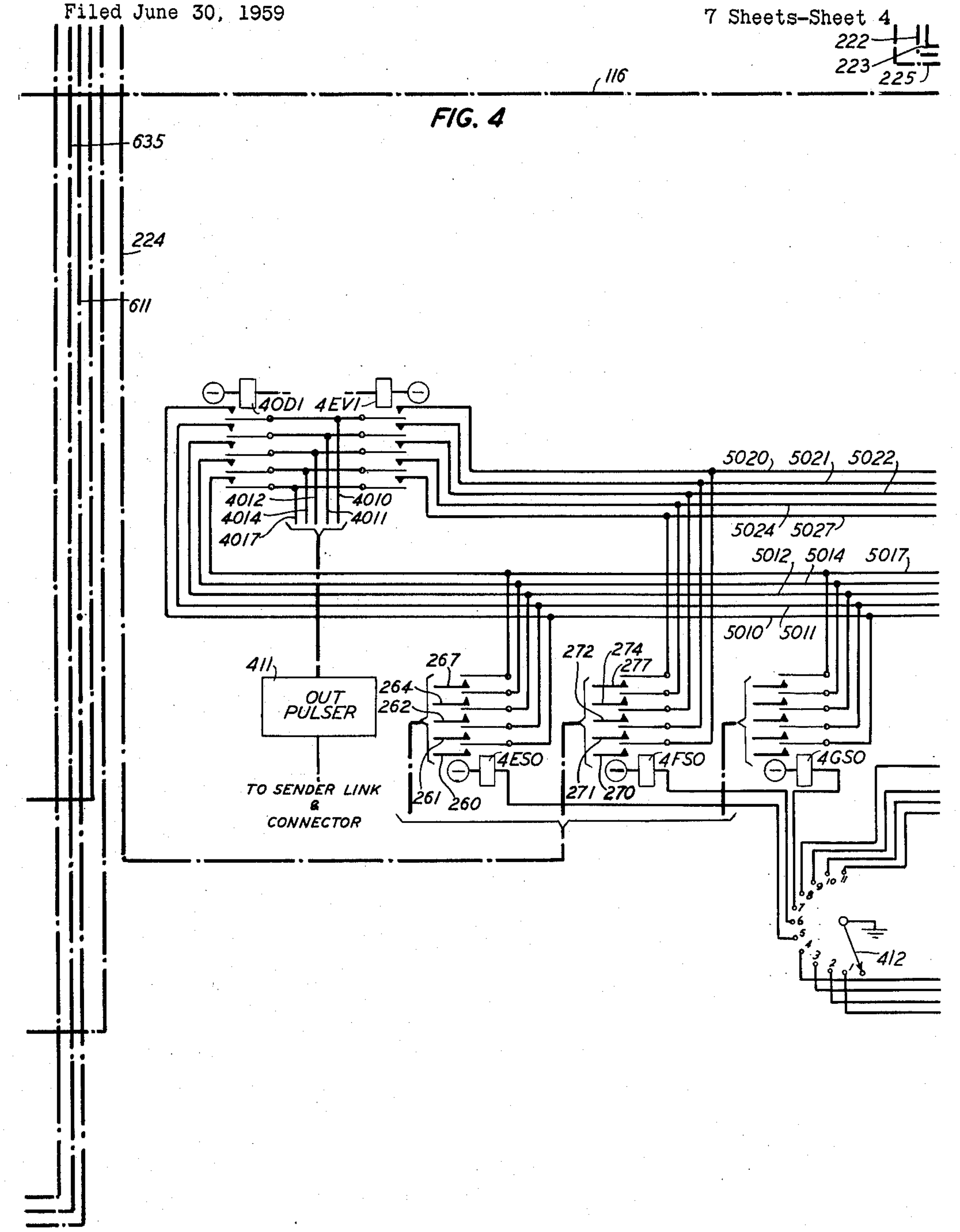
FIGS. 4 and 5 show the steering-out relays utilized in transferring the stored digits to the outpulsing circuit.

In like manner, the use of odd and even steering relays, as shown in FIGS. 1, 3 and 4, is merely illustrative and it is conceivable that arrangements may be made for delivering the digits to the storage relays and to the outpulser 411 without utilization of odd and even steering and without materially departing from the invention.

Moreover, the manner of progression of relays 5ASO–5DSO, 4ESO–4GSO and 5HSO–5LSO which is herein contemplated to be similar to the arrangements described in the patent to McKim et al. for the same function, may also be modified to operate from a program or clock pulse source.

In addition, it is intended that the arrangements and embodiments, shown herein, are merely illustrative and that modifications may be made by those skilled in the art without departing from the spirit and scope of the invention.

What is claimed is:

1. A register comprising a plurality of stages adapted to store coded signal information, said information including two distinct trains of signals, first and second channels for transmitting said trains of signals, each of said trains including a variable number of signals, the total number of signals in both of said trains remaining constant and equal in number to said plurality of stages, said signals in both of said trains collectively representing a single number or word, means in said register exclusively responsive to said signals in said first train transmitted over said first channel for storing said signals in the initial and succeeding stages of said register, and means in said register exclusively responsive to the signals of said second train transmitted over said second channel for storing the signals of said second train in the terminal and immediately preceding stages of said register.

2. A register in accordance with claim 1 including, in addition, outpulsing means, and means in said register responsive to the storage all of said signals in each of said trains for transferring the signals stored in said stages to said outpulsing means in a predetermined time sequence including means for transferring all of the signals of said first train to said outpulsing means before any of the signals of said second train.

3. Registration means including a plurality of tandemly connected stages adapted to store information included in two separate trains of signals, a first and second channel for respectively transmitting said trains of signals, each of said trains including a variable number of signals, the total number of signals in both of said trains remaining constant and equal in number to said plurality of stages, said signals in both of said trains collectively representing a single number or word, a first group of said stages being exclusively responsive to said signals in said first train transmitted over said first channel, a second group of said stages being exclusively responsive to said signals in said second train transmitted over said second channel, and a third group of said stages adapted for storage of both said first train signals and said second train signals in accordance with the ratio of signals in said first train to signals in said second train.

4. Registration means in accordance with claim 3 including, in addition, receiving means for receiving said signals in said first and second trains, and steering means for steering said signals from said receiving means to said stages.

5. Registration means in accordance with claim 4 wherein said steering means includes means for conveying said signals of said first train to said first group of stages, means for conveying said signals of said second train to said second group of stages, and means for conveying said signals of said first and second trains to said third group of stages.

6. A digit register arrangement including means for receiving and storing time related multifrequency and direct-current trains of pulses representing digits, a first plurality of stages in said register individually responsive to said multifrequency train of pulses, a second plurality of stages in said register individually responsive to said direct-current train of pulses, and a third plurality of stages in said register adapted to store either multifrequency or direct-current pulses in accordance with the ratio of the number of digits in said multifrequency train to said digits in said direct-current train.

7. A digit register arrangement in accordance with claim 6 including, in addition, steering means responsive to the ratio of multifrequency current digits to direct-current digits to govern the storage of signals in said third plurality of stages.

8. A digit register arrangement in accordance with claim 6 including, in addition, an out-steering register, transfer means for transferring said signals stored in said stages to said out-steering register in a sequence reflecting said time relation of said multifrequency and direct-current digits, said transfer means including means for transferring all of said multifrequency digits to said out-steering register before any of said direct-current digits.

9. A register including a plurality of stages, each of said stages being operable to store coded signals representing digits, said signals being arranged in a plurality of groups of signals, each of said groups including a variable quantity of signals, the total number of signals in all of said groups being constant and equal to the storage capacity of said register stages, means in said register responsive to one of said groups of signals for storing the digits represented thereby in a first and succeeding stages of said register, and means in said register responsive to another of said groups of signals for storing the digits represented thereby in a terminal and preceding stages of said register.

10. A register including a plurality of stages adapted to store coded signals, said signals individually representing digits and collectively representing a number or word comprising an integral block of information arranged in a predetermined time sequence, said digits being arranged in a plurality of trains of signals wherein the relative quantities of digits in each of said trains of signals may vary, and means for storing said signals in differing stages in accordance with the relative quantities of digits in said trains.

11. A register in accordance with claim 10 including additional means connectable to said stages and responsive to the relative quantities of digits in said trains for reading out the digits stored in said stages and rearranging said digits in said predetermined time sequence.

12. A register including a plurality of stages adapted to store coded signals representing a number or word arranged in a predetermined time order, said number comprising a train of multifrequency code signals and direct-current code signals wherein the relative quantities of signals in said multifrequency and direct-current trains of code signals may vary although the total quantity of signals in both trains is constant, and means for storing said multifrequency and direct-current signals in differing stages in said register in accordance with the relative quantities of signals in said trains.

13. A register in accordance with claim 12 including means responsive to the relative quantities of signals in said trains for reading out said signals stored in said stages and arranging said signals in said predetermined time order, all of said signals in said multi-frequency train being read out before any of said signals in said direct-current train.

14. A register arrangement including a plurality of stages adapted to store coded signals, said signals individually representing digits and collectively representing a number, said digits being arranged in two trains of pulse signals wherein the number of signals in each of said trains may vary although the cumulative number of signals in both trains is fixed, a first and second channel for respectively transmitting said trains of signals, a first group of register relays exclusively responsive to said signals in said first train transmitted over said first channel to store the digits represented therein, a second group of register relays exclusively responsive to said signals in said second train transmitted over said second channel to store the digits represented therein, and a third group of register relays responsive to said signals in said first and second trains to store the digits represented in both of said trains in accordance with the relative number of digits in each of said trains.

15. A register including a plurality of stages adapted to receive two trains of pulses characterizing digits, each of said trains including a variable number of digits in predetermined time relation, the total number of digits in both of said trains remaining constant and equal in number to said plurality of stages, said digits in both of said trains collectively representing a number or word, first and second channels for respectively transmitting said trains of digits, a first group of stages having relays exclusively responsive to said first train of digits transmitted over said first channel to store said digits, a second group of stages having relays exclusively responsive to said second train of digits transmitted over said second channel to store said digits, a third group of stages having relays responsive to said first and second train of digits in accordance with the ratio of digits in said first train to the digits in said second train to store said digits, and out-steering relays connectable to all of said stages and operable upon storage of all of said digits to transfer the digits stored in said stages in said predetermined time relation in response to the relative number of digits in each of said trains.

16. A register including a plurality of stages adapted to store coded signals representing a plurality of digits included in two distinct trains of signals, each of said trains including a variable number of digits, the total number of digits in both of said trains remaining constant and equal in number to said plurality of stages, receiving means adapted to receive said trains of signals, a first group of stages individually operable to store said digits in said first train, a second group of stages individually operable to store said digits in said second train, a third group of stages operable to store said digits in said first and second trains, and steering means connected to said receiving means and to said stages for transferring said digits received in said receiving means to said third group of stages in accordance with the relative number of digits in each of said trains, said steering means including means for transferring the digits in said first train to said first group of stages and for transferring the digits in said second train to said second group of stages.

17. A digital registration device including a plurality of relay stages including first, second and third groups of said stages, each of said stages adapted to store coded information representing a telephone directory number, said information including trains of time related multifrequency and direct-current pulses characterizing the digits of said directory number, the total number of digits in both of said trains remaining constant and equal in number to said plurality of stages, receiving means adapted to receive said multifreqency and direct-current trains of pulses, means for transferring the multifrequency digits received in said receiving means to said first group of stages, means for transferring said direct-current digits received in said receiving means to said second group of stages, and means for transferring said multifrequency current and direct-current digits received in said receiving means to said third group of stages in accordance with the relative number of digits in said multifrequency and direct-current pulse trains.

18. A digital registration device in accordance with claim 17 including in addition, an outpulsing circuit, and relay transfer means connectable to said stages and responsive to the ratio of multifrequency signals to direct-current signals to read out the information stored in said stages and transfer said information to said outpulsing circuit in said time relation.

19. A digital registration device in accordance wth claim 17 wherein each of said stages includes five relays adapted to store said coded information in the two-out-of-five code.

20. A digital registration device in accordance with claim 18 wherein said relay transfer means includes a separate relay for each permissible ratio of numbers of multifrequency signals to direct-current signals, said relays having individual contacts connectable to each of said stages in said register in response to said ratios of multifrequency to direct-current signals.

21. A digital registration device including a register having three groups of stages, multifrequency receiving means for receiving trains of multifrequency pulses, direct-current receiving means for receiving trains of direct-current pulses, each of said trains including a variable number of digits, the total number of digits in both of said trains remaining constant and being time related and collectively signifying a called telephone directory number, and a plurality of in-steering relays for individually coupling said multifrequency and direct-current receivers to said first and second groups of stages respectively and for coupling said receivers to said third group of stages in accordance with the ratio of multifrequency digits to direct-current digits, each of said stages including five relays operable in the two-out-of-five code to store said digits of said directory number.

22. A digital registration device in accordance with claim 21 including, in addition, an outpulsing circuit, and relay transfer apparatus for transfering said digits stored in said relay stages to said outpulsing circuit in accordance with said time relation.

23. A digital registration device including a register having three groups of relay stages, each of said stages adapted to store coded information representing digits, said information comprising two distinct trains of time related multifrequency and direct-current signals wherein the number of signals in said multifrquency train may vary from two to four and the number of signals in said direct-current train may vary from seven to nine, the total number of digits in both of said trains being invariably fixed at eleven and equal to the number of said stages whereby said trains collectively represent a called telephone directory number, direct-current receiving means and multifrequency receiving means, a plurality of in-steering relays for connecting said multifrequency and direct-current receivers to said relay stages, said in-steering relays including means for steering said multi-frequency digits into said first group of stages and said direct-current digits into said second group of stages, and additional means in said in-steering relays for connecting said direct-current and multifrequency digits to said third group of stages in accordance with the ratio of digits in both trains, said relay stages including five relays operable in the two-out-of-five code to store said digits.

24. A digital registration device in accordance with claim 23 wherein said in-steering relays include means for steering said digits into said stages in a physical order differing from said time relation of multifrequency and direct-current signals.

25. A digital registration device in accordance with claim 24 including in addition an out-steering relay register having a number of relays equal in number to the total number of digits stored in said stages, and means for connecting said out-steering relays to said stages in an order reflecting said time relation of multifrequency and direct-current signals.

26. A digital registration device in accordance with claim 25 wherein said means connecting said out-steering relays to said stages includes a number of relays equal in number to the permissible combinations of multifrequency and direct-current digits, said relays being operable in response to the ratio of multifrequency to direct-current digits, said relays each including a number of contacts equal in number to the total number of relays in said stages.

27. A digital registration device in accordance with claim 26 including in addition relay means responsive to the reception of a final multifrequency signal for operating said relay responsive to said combination reflecting the maximum number of multifrequency digits.

No references cited.